Feb. 17, 1942. E. J. ROTH 2,273,595
EXTRUSION DEVICE
Filed June 21, 1941 4 Sheets-Sheet 2

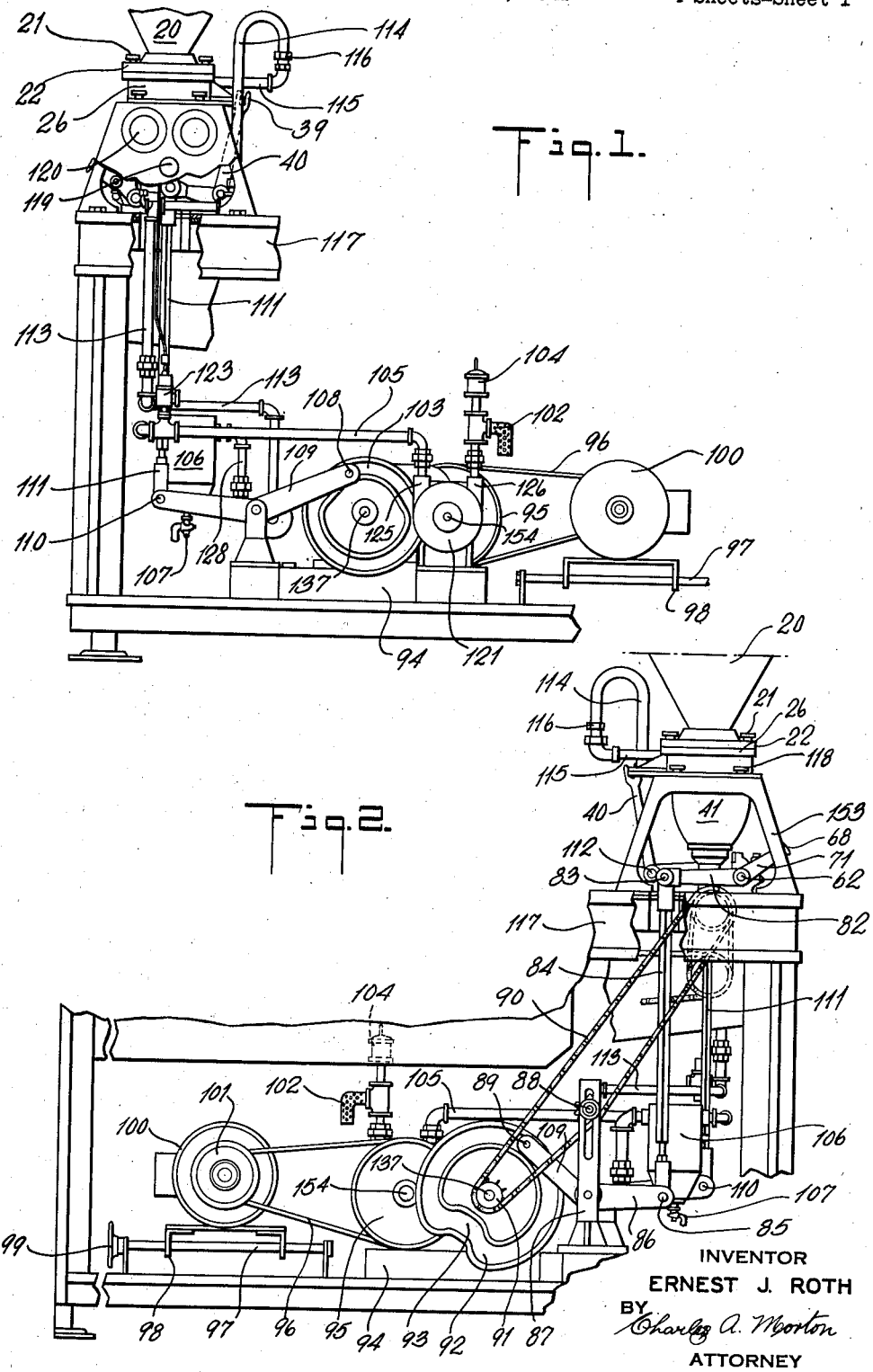

INVENTOR
ERNEST J. ROTH
BY Charles A. Morton
ATTORNEY

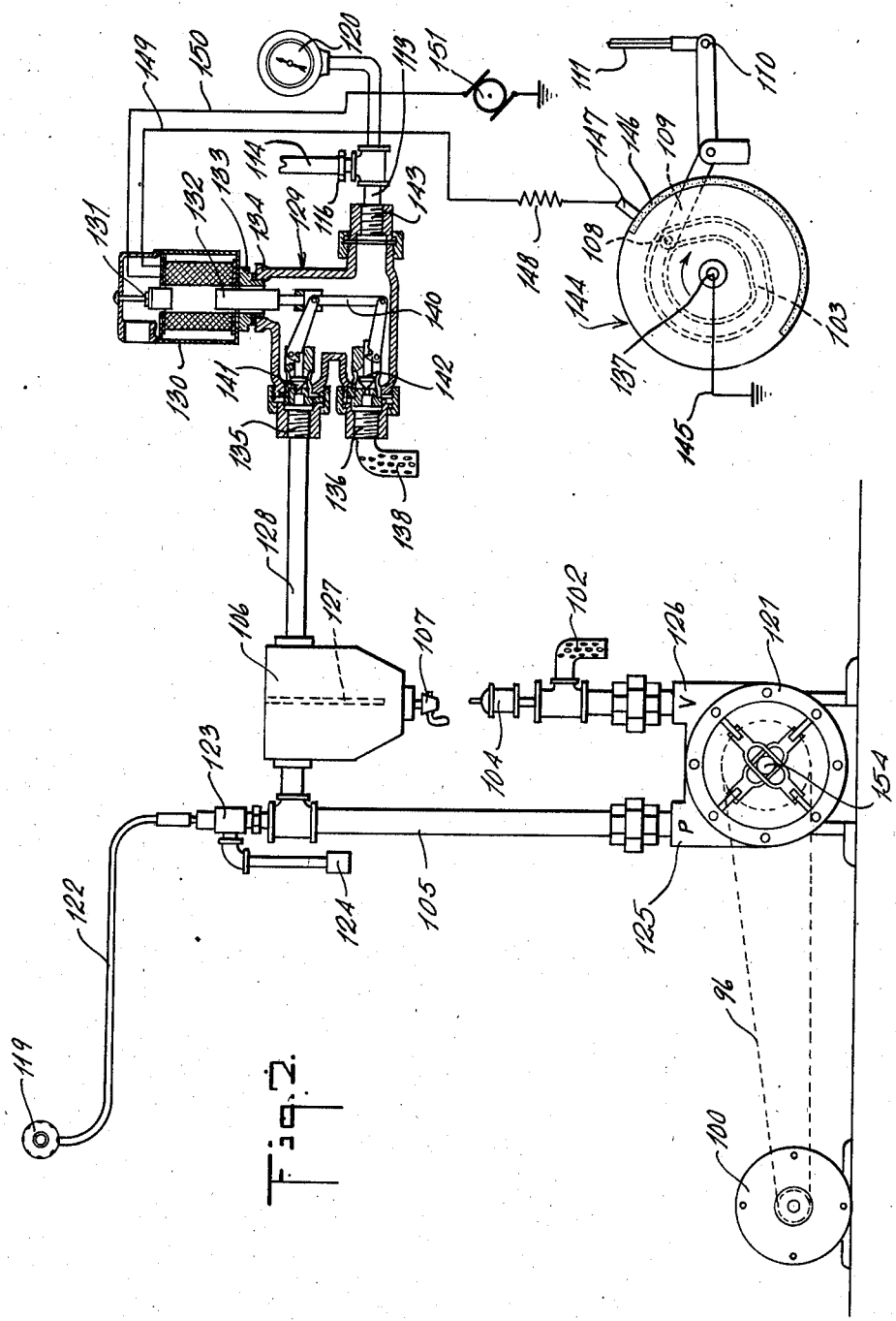

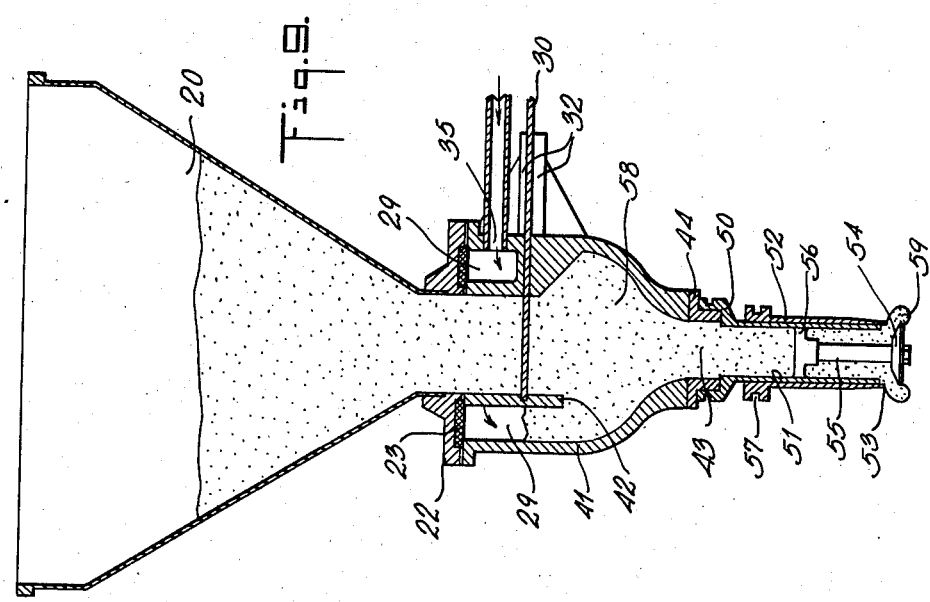

Patented Feb. 17, 1942

2,273,595

UNITED STATES PATENT OFFICE 2,273,595

EXTRUSION DEVICE

Ernest J. Roth, Norwood, N. J., assignor to Joe Lowe Corporation, New York, N. Y., a corporation of Delaware Application June 21, 1941, Serial No. 399,061

5 Claims. (Cl. 107—14)

This invention relates to improvements in extrusion devices, and more particularly to extrusion machines of the die expressing type of the character disclosed generally in my application S. N. 368,797, filed December 6, 1940, now Patent Number 2,246,758, issued June 24, 1941, of which the present application is a continuation in part. The invention is particularly applicable for use in the extrusion of plastic formations of edible products such as raw doughnuts made from batter.

The principal object of this invention is to reduce agitation of the plastic material during its passage through the machine, to a minimum, thus reduction "working" of the plastic material, so as to avoid toughening of the finished product.

Another object is to insure uniformity of size of the extrusions.

Another object is an extrusion machine which is positive in operation.

Another object is an extrusion machine which is easy to regulate to effect a positive, instantaneous, and accurate variation, in the size of the extrusions.

Another object is a simple, compact, extrusion machine, which can be quickly disassembled, thoroughly cleaned, and thereafter rapidly reassembled for further use.

Another object is an extrusion machine of rugged construction and of fewer working parts than are found in extrusion machines of the prior art.

Another object is the substantial elimination of wastage of the plastic material.

Another object is an extrusion machine which can be reloaded without stopping the machine.

Other objects will appear from the following detailed description.

In accordance with this invention the plastic material is deposited in a hopper open to atmosphere at the top, said hopper having an intermittently valved connection with an intermittently vented extrusion outlet, so that when the valve connection to the hopper is opened, the plastic material flows under the influence of gravity through the open valve in the direction of the extrusion outlet whereupon the valve closes to cut off communication with the hopper; the pressure below the said valve is rapidly built up to a value substantially above atmosphere while the extrusion outlet is opened to expel some of the plastic material through said extrusion outlet and the extrusion outlet is then closed to sever the extruded plastic; the pressure below the valve is reduced to atmosphere before said valve is again opened to permit more dough to flow from the hopper The size of the extrusion may be controlled in a very positive manner, regardless of the viscosity of the plastic, by regulating the degree of air pressure within the extrusion device.

In the drawings comprising four sheets of nine figures numbered Figs. 1 to 9 inclusive;

Fig. 1 is a view of one side of the extrusion machine and includes a power unit associated therewith, all assembled in operating position upon an automatic doughnut machine;

Fig. 2 is a view of the opposite side of the apparatus assembly of Fig. 1;

Fig. 7 is a diagrammatic view of the pump and piping system of the power unit; and Figs. 8 and 9 are comparative diagrams showing the operation of the extrusion machine feed unit during two different stages of the operating cycle.

Like reference characters designate corresponding parts throughout the several figures of the drawings.

Figure 3:
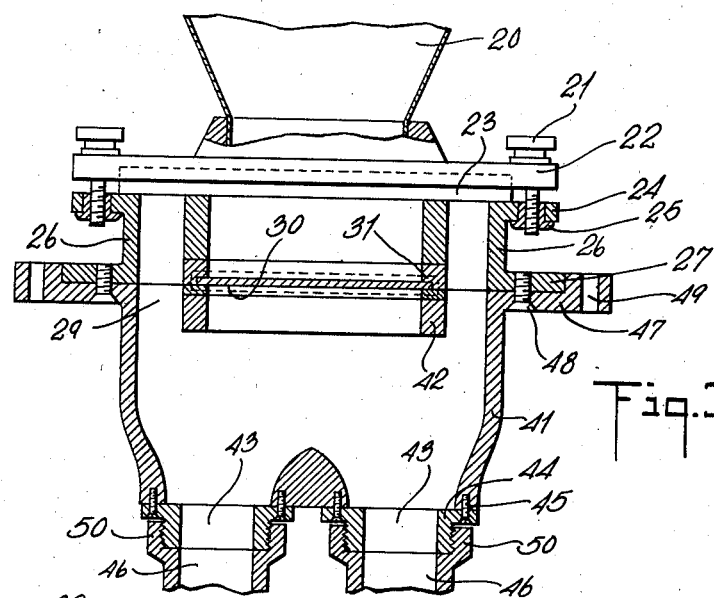
Fig. 3 is a vertical cross section of the extrusion machine feed unit, with some of the parts partially broken away.

The extrusion machine consists essentially of: a feed unit (Fig. 3) having a feed hopper 20 for receiving plastic material, a slide valve 30 for controlling the flow of the plastic downwards by gravity from the hopper 20 into the chamber formed by the lower casting 41, and an intermittently vented extrusion outlet consisting of sleeve 51 (Figs. 5 and 6), through which the plastic is extruded under pressure over a forming die 54 which imparts the desired shape to the plastic, the plastic formation being thereafter severed and released by the action of the sleeve cutter or cutting die 52; in combination with a power and control unit (Figs. 1 and 2), for opening and closing the slide valve 30 and the cutting die 52 of the extrusion outlet in properly timed sequence, said power and control unit including a compressed air pump, and means for driving the pump and control unit; and the necessary connecting rod and air pipe connections, for combining the power and control unit, with the slide valve, with the extrusion outlet, and with the air chamber 29, respectively, of the feed unit.

The lower end of the hopper 20 is welded in the opening formed in a base plate 22. Plate 22 is detachably secured to the upper face of the upper casting 26, by means of a series of knurled bolts 21, which screw into the bronze bushings 25 embedded in the holed flange 24 of upper casting 26. A gasket 23 is clamped between hopper base plate 22 and the upper face of upper casting 26, to provide an air-tight fit. A series of partition walls 28 separate upper casting 26 into an inner compartment, and an air chamber 29, surrounding said inner compartment. The partition walls 28 of the inner compartment are connected to the outer wall of upper casting 26 by a series of vertical webs 33—33, by the horizontal baffle plate 152, and by the vertical webs forming the baffle plates 34—34. The upper face of the webs 33—33 and of the baffle plates 34—34 are not flush with the upper face of the partition walls 28—28, but terminate slightly below the face of the partition walls 28—28 to define air passages for connecting the various compartments of air chamber 29 together.

Figures 4, 5:
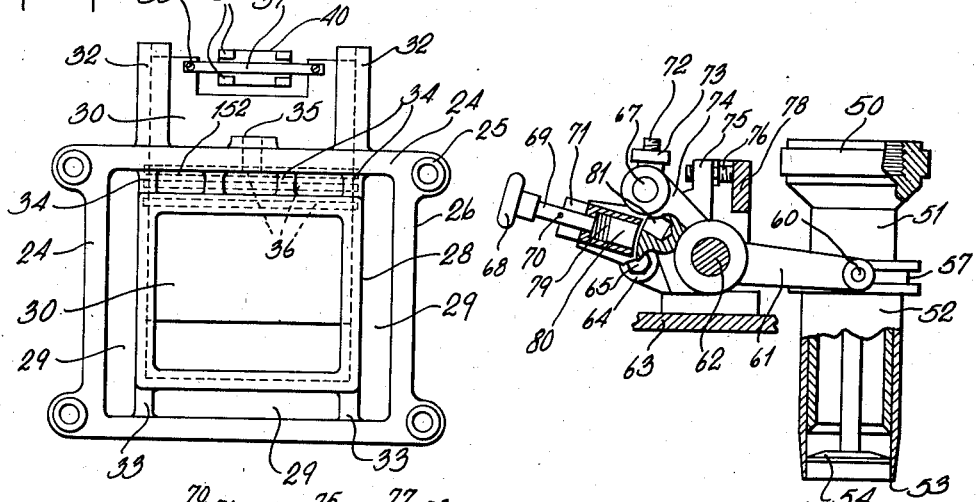
Fig. 4 is a top plan view on the dough chamber of the feed unit of Fig. 3, with the hopper base plate removed.
Figs. 5 and 6 are side views, partly in cross section, of the intermittently vented extrusion outlet and its associated clutch mechanism, showing the sleeve cutter and forming die in different positions.

Upper casting 26 registers with the lower casting 41, the flanges 27 of the upper casting nesting in the flanges 47 of the lower casting, and the two castings being clamped together by a series of machine screws 48—48 (Fig. 3). The holed ears 49 of flange 47 are used to secure the feed unit to a supporting bracket 153 (Fig. 2) by means of a series of knurled bolts 118. The lower casting 41 is subdivided by means of a series of partition walls 42—42 into an inner chamber and an outer chamber; the partition walls 42—42 being secured to the walls of lower casting 41 by means of webs generally similar to the webs 33—33 (Fig. 4) of upper casting 26. The partition walls 42—42 of lower casting 41 register with the partition walls 28—28 of upper casting 26. Oppositely disposed rabbeted bronze inserts are embedded in the adjacent lower and upper face of partition walls 28 and 42, to jointly define a guide channel for the knife blade 30 (Figs. 3 and 4). Knife blade 30 operates back and forth in the guide channel 31 formed by the bronze inserts, to connect the hopper 20 with, and disconnect hopper 20 from, the chamber formed by lower casting 41 wherein the plastic material 58 (Fig. 9) is housed. The baffle plate 152 (Fig. 4) prevents any plastic material adhering to the knife blade from working its way upwards between the baffle plates 34—34 into the air port 35. The inwardly disposed faces of the baffle plates 152 are provided with two or more V shaped slots 36—36 which trap any plastic adhering to the face of knife blade slide valve 30, and the plastic thus trapped effectively seals the knife blade opening against any leakage between air chamber 29 and atmosphere.

Slide valve 30 is actuated by a bifurcated lever arm 40 having two pairs of bifurcated fingers 39—39. An actuating pin 37 secured to the outer end of slide valve 30 by means of the machine screws 38—38, is cradled between the pairs of bifurcated fingers 39 of the bifurcated lever arm 40, so that when the lever arm 40 is rocked upon its drive shaft 112 (Fig. 2), a reciprocating sliding movement is imparted to the slide valve 30. The wall of upper casting 26 is drilled and tapped to form an air port 35 (Fig. 4) providing an air pipe connection with the air chamber 29 (Fig. 8).

The lower end of lower casting 41 terminates in one or more extrusion outlets 43 (Fig. 3), each outlet 43 being prolonged by a male threaded bushing 44 which is detachably secured to the bottom wall of lower casting 41 by means of the bushing screws 45—45 which are screwed into the bottom wall of casting 41. An extrusion nozzle 46 is detachably secured to the male threaded bushing 44 by means of a female threaded collar 50 formed at the upper end of said extrusion nozzle which extends downwards to form an inner sleeve 51 which is outwardly bevelled at its lower extremity. A sleeve cutter 52 (Fig. 5) is slidably mounted upon inner sleeve 51, the lower edge of sleeve cutter 52 being bevelled at 53 to form a relatively thin cutting edge. A forming die 54 having a downwardly and outwardly bevelled edge is mounted upon a stem 55 which is male threaded at the upper end to register in the female threaded opening of a spider 56 forming a part of the casting of inner sleeve 51. The forming die 54 is positioned in spaced relation to the lower extremity of inner sleeve 51, so that the plastic material extruded through the extrusion nozzle flows over the forming die 54 to form a plastic formation having an opening therein conforming in contour to the contour of the forming die. When the apparatus is used in making doughnuts the forming die 54 may be disc shaped, so as to mold the batter in annular form. The internal diameter of sleeve cutter 52 is slightly larger than the over all diameter of inner sleeve 51 and forming die 54, so that sleeve cutter 52 will slide telescopically relative to inner sleeve 51 and forming die 54 with a snug fit (compare Figs. 5, 6, 8, and 9).

Each cutting sleeve 52 terminates at its upper end in a shoulder including an annular channel 57 wherein the lifting pins 60—60 of a lifting fork (Fig. 5) normally engage to control the telescopic action of the sleeve cutter 52 on inner sleeve 51. Each sleeve cutter 52 is separately operated by its associated but independent lifting fork 61, said forks being freely pivotally mounted upon one common rocking shaft 62. Each lifting fork 61 is provided with separate clutch mechanism (Figs. 5 and 6), so that the operation of each sleeve cutter 52 and its associated forming die 54 can be independently controlled, to selectively operate any one or more of the forming and cutting dies as desired.

Figure 6:
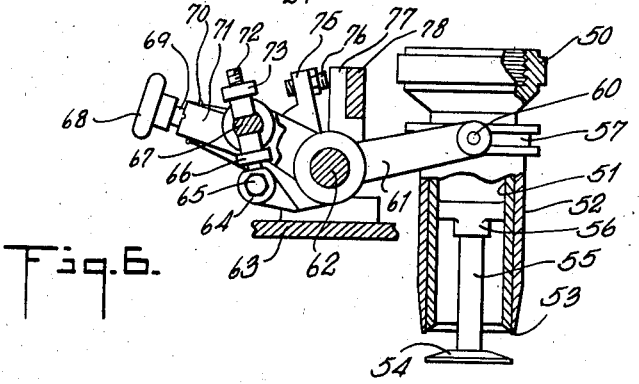

Each clutch mechanism (Figs. 5 and 6) consists of two distinct elements namely: a clutch 75, and a clutch pin 69. The forks 61, and their respective clutches and clutch pins, are all mounted upon one common rocking shaft 62, the hubs of the housings 71 being keyed to the shaft 62, while each clutch 75 and its associated fork 61 is freely pivotally mounted upon the rocking shaft 62, and is provided with an adjustable connection 72 between fork 61 and its clutch 75, to permit adjustment of sleeve cutter 52 relative to its associated forming die 54. Referring to Figs. 5 and 6, clutch pin 69 is slidably mounted in a hollow cylinder forming a housing 71. A coiled spring 79 is mounted upon pin 69 between the head 80 of the pin and the shoulder of the housing 71. A locking pin 70 (Fig. 6) slides in a slot in the wall of the housing, but by pulling clutch knob 68 outwards until locking pin 70 of clutch pin 69 clears the said slot, the knob 68 may be rotated until locking pin 70 engages in notches cut in the shoulder of housing 71, to retain clutch pin 69 in disengaged position (Fig. 5). In its engaged position the head 80 of clutch pin 69 registers in a socket 81 formed in clutch 75, and in this position clutch pin 69 and clutch 75 rock together upon rocking shaft 62 to rock lifting fork 61, thus raising and lowering the bevelled edge 53 of sleeve cutter 52 past the bevelled edge of forming die 54. An adjustable stop 76 engages a safety stop bar 78 to limit the forward movement of clutch 75 when clutch pin 69 is disengaged from clutch 75 (Fig. 5), whereby the forward movement of clutch 75, and therefore of lifting fork 61, is arrested, thus preventing fork 61 from rocking about shaft 62 to such an angle as to disengage the lifting pins 60—60 from the annular channel 57 of the shoulder of sleeve cutter 52, thereby preventing sleeve cutter 52 from being released and falling off inner sleeve 51 into frying kettle 117 (Fig. 1). A hexagon headed pivot bolt 65 passes through the ear 64 of threaded adjusting pin 72 to secure pin 72 and clutch 75 together. Adjusting pin 72 also passes through an opening in a cross pin 67 which is journalled in the bifurcated ears 74 formed at the outer end of lifting fork 61, and by varying the position of the lower and upper adjusting nuts 66 and 73 upon the threaded adjusting pin 72, the size of the opening between the bevelled edge 53 of sleeve cutter 52 and forming die 54 may be regulated. Each lifting fork 61 can thus be independently adjusted relative to its associated clutch 75, so that each cutting and forming die can be separately adjusted. To operate the extrusion machine at maximum capacity all of the clutch pins 69 are engaged in the sockets 81 of their respective clutches 75, while to reduce the delivery capacity of the extrusion machine one or more clutch pins 69 is disengaged (Fig. 5) from the socket 81 of its clutch 75.

The operation of the extrusion machine feed unit (Figs. 3 to 5) is controlled by a control unit (Figs. 1 and 2), positioned beneath the frying kettle 117. The various elements of the control unit may be mounted in any suitable manner beneath the frying kettle. The control unit includes a gear reduction box 94 having pulley 95 driven from the adjustable pulley 101 of an electric motor 100 by a V drive belt 96. A pressure pump 121 which is mounted upon the shaft 154 of pulley 95 rotates in unison therewith. The box cams 92 (Fig. 2), and 103 (Fig. 1), are both mounted upon a cam shaft 137 which is driven from shaft 154 by means of a reducing gear train (not shown) mounted in the gear reduction box 94. Cam follower 89 (Fig. 2) mounted on one end of bell crank lever 86 follows box cam 92 to rock lever arm 82 via connecting rod 84, thus controlling the telescopic action of the sleeve cutter 52—52 (Figs. 5 and 6); while cam follower 108 (Fig. 1) mounted upon one end of bell crank lever 109, follows box cam 103 to rock bifurcated lever arm 40 (Fig. 2) thus controlling the back and forth motion of the knife blade slide valve 30 (Fig. 3). In the position of cam follower 89 as shown in Fig. 2, the sleeve cutters 52—52 (Figs. 5 and 8) would be closed by way of bell crank lever 86, crank pin 85, connecting rod 84, lever pin 83, lever arm 82, clutch shaft 62, clutch pin housing 71, clutch pin 69, clutch 75, lifting fork 61, lifting pins 60—60, and sleeve cutter 52. When by the rotation of box cam 92, cam follower 89 passes through the flat V shaped portion 93 of the box cam, bell crank lever 86 rocks to control the up and down telescopic action of the sleeve cutter 52—52. With cam follower 108 in the position shown in Fig. 1, knife blade slide valve 30 is open (Fig. 4), but as shaft 137 (Fig. 1) continues to rotate, cam follower 108 enters the semicircular portion of box cam 103, thus rocking bell crank lever 109, crank pin 110, connecting rod 111, lever arm 40, and actuating pin 37 (Fig. 4), of knife blade slide valve 30, to close the knife blade slide valve.

Pressure pump 121 (Figs. 1 and 7) which is connected to the main shaft 154 of gear reduction box 94, delivers compressed air through its pressure port 125 to compressed air line 105. Oil for pump 121 is supplied from a drip oil cup 104 (Figs. 1, 2, and 7). The intake port 126 of pump 121 is connected to atmosphere by way of an open ended perforated intake 102. Intake 102 has an open mouth, so that if the perforations are accidentally covered up, said open mouth will prevent any sealing up of the intake side of the pump, and the intake 102 is perforated so that if its open mouth is accidentally plugged the perforations will still admit air to the intake side 126 of pump 121. Compressed air line 105 (Fig. 7) is connected through an oil trap 106 and compressed air line 128 to a three-way valve 129. A baffle plate 127 is inserted in oil trap 106 to prevent any drops of oil carried into compressed air pipe 105 by the rotation of pressure pump 121 from entering compressed air line 128, or any part of the pneumatic system therebeyond, such as the three-way valve 129. A pet cock 107 is used for periodically draining trapped oil from oil trap 106. The degree of pressure in the pneumatic system is regulated by a regulating valve 123 which is controlled by a regulating knob 119 which connects with the valve 123 by means of a flexible cable 122, any excess pressure being vented at exhaust port 124.

In the drawings the extrusion device is shown in association with an automatic doughnut machine, the feed unit being mounted above the doughnut frying kettle 117 so that the formations of plastic material 59 (Fig. 9) which are made of doughnut batter will fall into the frying kettle and will be conveyed through the frying kettle by means of a travelling conveyor (not shown) during the cooking operation. The travelling conveyor is operated by suitable gears and sprockets which are driven by the conveyor drive chain 90 operated by the drive sprocket 91 which is keyed to cam shaft 137. The tension of the drive chain 90 may be regulated by varying the position of the adjustable idler sprocket 88, which is slidably adjustable in a bracket 87 for that purpose. The speed of the pulley 95 of gear reduction box 94 may be varied by turning worm screw control 99, thus operating the worm screw 97 which passes through the threaded ears 98 of the motor base to move motor 100 towards and away from the pulley 95. The adjustable pulley 101 functions to vary the position of the V shaped drive belt 96 in pulley 101, thus varying the speed of pulley 95 and of gear reduction box 94.

The compressed air pipe 128 is connected to the air chamber 29 (Fig. 3) of the feed unit by means of the nipple 115 (Fig. 8). The ends of a flexible hose 114 are respectively connected by means of hose couplings 116 to the nipple 115 (Fig. 1) and to the delivery port 143 (Fig. 7) of three-way valve 129. The pressure value in the flexible hose 114 is indicated by the pressure gauge 120. Three-way valve 129 is operable to alternately connect delivery port 143 with pressure inlet 135 and compressed air line 128 in one position of the three-way valve; and then with exhaust port 136 and exhaust nipple 138 in the alternate position of the three-way valve. Any suitable form of three-way valve timed to operate in proper sequence with slide valve 30 and sleeve cutters 52—52, may be used for this purpose. In the drawings the mechanism for actuating the three-way valve consists of a solenoid 130, having valve plungers 141 and 142, mechanically coupled to suitable operating levers pivotally connected to a rod 140 which forms an extension of the solenoid plunger 132. In the position shown in Fig. 7 the solenoid is deenergized, and its plunger 132 has fallen under the influence of gravity to the release position. In the release position of plunger 132, valve plunger 141 seals pressure inlet 135 and disconnects compressed air line 128 from flexible hose 114; at the same time valve plunger 142 opens the valve of exhaust port 136 thus connecting flexible hose 114 to atmosphere at exhaust nipple 138. Under these conditions the air pressure in chamber 29 of the feed unit is reduced to atmosphere, and any plastic material 58 (Fig. 8) entering lower casting 41, displaces its own volume of air from air chamber 29 through nipple 115, flexible hose 114, and exhaust nipple 138, to atmosphere.

The solenoid 130 is energized over an operating circuit including the interrupter ring 144 which is mounted upon the cam shaft 137, to rotate in synchronism with box cams 92 and 103. Interrupter ring 144 includes a metallic segment and an insulated segment 146. The metallic segment is grounded by way of ground lead 145. A battery, or other suitable source of electric current, such as the generator 151, may be employed to supply electrical energy to the solenoid circuit. The circuit may include a suitable resistance coil 148. The solenoid circuit is interrupted at interrupter brush 147 whenever the insulated segment 146 passes under the brush. When brush 147 is in contact with the metal segment of the interrupter ring, a circuit is closed from generator 151, over power lead 150, through the winding of solenoid 130, conductor 149, resistance coil 148, brush 147, interrupter ring 144, to ground lead 145, thus closing the circuit to energize solenoid 130. When the solenoid is energized its plunger 132 is drawn upwards into contact with pole piece 131 thus lifting rod 140, thus closing the valve controlled by valve plunger 142; and disconnecting flexible hose 114 and air chamber 29 from atmosphere while at the same time opening the valve controlled by valve plunger 141 thus connecting compressed air supplied by pump 121 over air line 128 to flexible hose 114 and to air chamber 29 of the feed unit. Solenoid 130 remains energized, supplying compressed air to chamber 29, so long as interrupter brush 147 is in contact with the metal segment of interrupter ring 144, but when the interrupter ring rotates to bring the insulated segment 146 into contact with the brush 147, the operating circuit for solenoid 130 is opened deenergizing the solenoid, disconnecting flexible hose 114 from pressure pump 121, and exhausting the compressed air in the chamber 29 of the feed unit to atmosphere at exhaust nipple 138.

Some plastic materials such for example as dough batter, give better results if kept as cool as possible. In the present invention the inner dough chamber is substantially surrounded by the air chamber 29, and the rapid circulation of the air in air chamber 29 due to the constant action of pump 121 and of three-way valve 129, tends to keep the walls 28 and 42 of the inner chamber cool at all times, thus keeping the plastic material at a relatively lower temperature than would otherwise be the case.

The lower face of the hopper base plate 22, and the upper face of upper casting 26, are both recessed to receive the gasket 23. Gasket 23 may be made of any suitable resilient material, but a gasket made of neoprene gives good results. The thickness of the gasket is such that when the gasket connection is completely air tight the lower face of base plate 22 will still be separated from the upper face of upper casting 26. Gasket 23 may be permanently cemented in the recess in base plate 22 with a suitable cement.

The electro-mechanical valve 129 may be replaced by a mechanically operated three-way valve, in which case the interrupter ring 144 and its associated electrical circuit including solenoid 130, would be replaced by suitable cam mechanism, and by link, and lever mechanism for mechanically coupling the cam mechanism to the three-way valve. One suitable form of mechanically operated valve is disclosed in my U. S. Patent 2,246,758.

PRINCIPLE OF OPERATION

Feed stroke

Plastic material such as dough batter is put into hopper 20. As cam shaft 137 rotates cam follower 108 (Fig. 1) enters the eccentric segment of box cam 103 and knife blade slide valve 30 starts to open to establish a continuous passage between hopper 20, extrusion outlet 43 and inner sleeve 51. When cam follower 108 reaches the top portion of the eccentric segment of box cam 103 (Fig. 1), knife blade slide valve 30 is fully open, and dough flows downwards through the open slide valve 30 to fill lower casting 41 with dough. Any air displaced by the dough is forced out of air chamber 29, along nipple 115, flexible hose 114, through three-way valve 129 which is released, and exhaust nipple 138, to atmosphere. During this feed stroke: interrupter brush 147 is in contact with the insulated segment 146 of interrupter ring 144 thus opening the circuit of solenoid 130 (Fig. 7) to release plunger 132 and rod 140 whereby compressed air line 128 is sealed by valve plunger 141 and valve plunger 142 is opened to connect delivery port 143 to atmosphere at exhaust nipple 138; cam follower 108 is traversing the eccentric portion of box cam 103 to open knife blade 130; and cam follower 89 (Fig. 2) is traversing the circular portion of box cam 92 to hold the sleeve cutters 52 in the position shown in Fig. 8, thus closing the extrusion outlets.

Extrusion stroke

The continued (clockwise) rotation of cam shaft 137 causes cam follower 108 to enter the circular segment of box cam 103 (Fig. 7) whereupon knife blade slide valve 30 is closed (Fig. 9) to disconnect hopper 20 from lower casting 41. As cam shaft 137 continues to rotate the metal segment of interrupter ring 144 makes contact with interrupter brush 147 to close the energizing circuit for solenoid 130, thus connecting compressed air line 128 to flexible hose 114 and to air chamber 29, to build up the pressure in air chamber 29 to the desired value. As cam shaft 137 continues to rotate cam follower 89 (Fig. 2) enters the flattened V segment 93 of box cam 92 to cause the sleeve cutters 52 to be drawn upwards on their associated inner sleeves 51, thus opening the extrusion outlets and extruding the formation of plastic material 59 (Fig. 9). The continued rotation of cam shaft 137 returns cam follower 89 to the circular segment of box cam 92 whereupon the sleeve cutters 52 move downwards (Fig. 8) to close the extrusion nozzles, and as the bevelled edge 53 of each sleeve cutter passes around and beyond the bevelled edge of its forming die 54 it severs and releases the extruded formation of plastic material 59 which falls into the pocket of the travelling conveyor immediately beneath forming die 54. The movement of the travelling conveyor carries the plastic formation through the frying kettle 117, where, in the system illustrated, it is fried to produce a doughnut. The continued rotation of cam shaft 137 brings the insulated segment 146 of interrupter ring 144 into contact with brush 147 to open the energizing circuit for solenoid 130, thus releasing the solenoid, thereby disconnecting flexible hose 114 from compressed air line 128, and connecting the hose line to atmosphere via exhaust nipple 138, thus bleeding the air chamber 29 and equalizing the pressure in said air chamber with atmosphere. The further rotation of cam shaft 137 causes cam follower 108 to recnter the eccentric segment of box cam 103, whereupon knife blade slide valve 30 is reopened, and the cycle of operation is repeated.

The size of the plastic extrusion 59 can be regulated immediately and within very critical limits by operating regulating knob 119 to increase or decrease the pressure in compressed air line 105 and consequently in flexible hose 114 and air chamber 29.

What is claimed is:

1. In an extrusion machine and in combination, a chamber for housing plastic material, said chamber having a valved inlet through which plastic may be admitted into, and a valved outlet through which plastic may be extruded out of, said chamber, a pump for supplying compressed air to said chamber when the inlet valve is closed and the outlet valve is open to extrude plastic from said chamber, an exhaust port for venting said chamber to atmosphere, a three-way valve operable to intermittently disconnect said pump from said chamber and connect said chamber with the exhaust port to equalize the pressure in said chamber with atmosphere before the inlet port opens to admit plastic into the chamber, to disconnect said exhaust port from said chamber after the inlet port closes, and then to connect said pump to said chamber to rapidly build up the pressure within the chamber substantially above atmosphere before the outlet valve opens to allow plastic to be extruded through said extrusion outlet, and means for opening and closing said inlet and outlet valves and for operating said three-way valve in properly timed sequence.

2. In an extrusion machine and in combination, a chamber for housing plastic material, said chamber having a valved inlet through which plastic may be admitted into, and a valved outlet through which plastic may be extruded out of, said chamber, a pump for supplying compressed air to said chamber when the inlet valve is closed and the outlet valve is open to extrude plastic from said chamber, an exhaust port for venting said chamber to atmosphere, a three-way valve operable to intermittently disconnect said pump from said chamber and connect said chamber with the exhaust port to equalize the pressure in said chamber with atmosphere before the inlet port opens to admit plastic into the chamber, to disconnect said exhaust port from said chamber after the inlet port closes, and then to connect said pump to said chamber to rapidly build up the pressure within the chamber substantially above atmosphere before the outlet valve opens to allow plastic to be extruded through said extrusion outlet, means for opening and closing said inlet and outlet valves and for operating said three-way valve in properly timed sequence, and manually controlled means for regulating the pressure within said chamber to control the amount of plastic extruded through said extrusion outlet.

3. In an extrusion machine and in combination, a chamber for housing plastic material, said chamber having a valved inlet through which plastic may be admitted into, and a valved outlet through which plastic may be extruded out of, said chamber, a pump for supplying compressed air to said chamber, an exhaust port for venting said chamber to atmosphere, an electro-magnetic three-way valve, said three-way valve being operable, to intermittently disconnect said pump from said chamber and connect said chamber with said exhaust port to vent said chamber to atmosphere before the inlet valve opens to admit plastic into said chamber, to disconnect said exhaust port from said chamber after the inlet valve closes, and then to connect said pump to said chamber to rapidly build up pressure within the chamber substantially above atmosphere before the outlet valve opens to allow plastic to be extruded therethrough, an electrical control circuit for said electro-magnet, said control circuit being operable to actuate said electro-magnet to operate said three-way valve, and means for opening and closing said inlet and outlet valves and said control circuit in properly timed sequence.

4. In an extrusion machine and in combination, a chamber for housing plastic material, said chamber having a valved inlet through which plastic may be admitted into, and a valved outlet through which plastic may be extruded out of, said chamber, a pump for supplying compressed air to said chamber, an exhaust port for venting said chamber to atmosphere, an electro-magnetic three-way valve, said three-way valve being operable, to intermittently disconnect said pump from said chamber and connect said chamber with said exhaust port to vent said chamber to atmosphere before the inlet valve opens to admit plastic into said chamber, to disconnect said exhaust port from said chamber after the inlet valve closes, and then to connect said pump to said chamber to rapidly build up pressure within the chamber substantially above atmosphere before the outlet valve opens to allow plastic to be extruded therethrough, an electrical control circuit for said electro-magnet, said control circuit being operable to actuate said electro-magnet to operate said three-way valve, means for opening and closing said inlet and outlet valves and said control circuit in properly timed sequence, and means for regulating the pressure of the compressed air supplied to said chamber to control the amount of plastic extruded through said extrusion outlet.

5. In an extrusion machine and in combination: a feed unit comprising, a chamber for housing plastic material, a valved inlet through which plastic may be admitted into said chamber, a valved outlet through which plastic may be extruded from said chamber; a control unit separate and distinct from the feed unit, said control unit comprising, a pump, a three-way valve connected to said pump, an electro-magnet for operating said three-way valve, a circuit interrupter, a wiring circuit including said electro-magnet and said interrupter, cam mechanism, said cam mechanism, three-way valve, and the wiring circuit of said electro-magnet, being respectively adapted to be mechanically, pneumatically, and electrically connected to the inlet and outlet valves, and to the chamber, of the feed unit, and to an electric current source, to operate in properly timed relation to open and close said inlet and outlet valves and to energize and de-energize said electro-magnet, thereby increasing and decreasing the pressure in said chamber in pre-determined cyclic order, to control the periodic admission of plastic into the feed unit chamber, the periodic extrusion of plastic formations from the feed unit chamber, and the periodic severance of the plastic extrusions thus formed.

ERNEST J. ROTH.